US012643314B2

(12) United States Patent
Wang et al.

(10) Patent No.: US 12,643,314 B2
(45) Date of Patent: Jun. 2, 2026

(54) MULTIFUNCTIONAL SHEETS AND LAMINATES, ARTICLES, AND METHODS

(71) Applicant: DUPONT ELECTRONICS, INC., Wilmington, DE (US)

(72) Inventors: Ping Wang, Shanghai (CN); Chong Yang Wang, Shanghai (CN); Zheyue Yang, Shanghai (CN)

(73) Assignee: DUPONT ELECTRONICS, INC., Wilmington, DE (US)

( * ) Notice: Subject to any disclaimer, the term of this patent is extended or adjusted under 35 U.S.C. 154(b) by 237 days.

(21) Appl. No.: 18/249,775

(22) PCT Filed: Oct. 23, 2020

(86) PCT No.: PCT/CN2020/123116
§ 371 (c)(1),
(2) Date: Apr. 20, 2023

(87) PCT Pub. No.: WO2022/082702
PCT Pub. Date: Apr. 28, 2022

(65) Prior Publication Data
US 2023/0398771 A1 Dec. 14, 2023

(51) Int. Cl.
*B32B 27/08* (2006.01)
*B32B 27/32* (2006.01)

(52) U.S. Cl.
CPC .............. *B32B 27/08* (2013.01); *B32B 27/32* (2013.01); *B32B 2307/302* (2013.01); *B32B 2307/72* (2013.01)

(58) Field of Classification Search
None
See application file for complete search history.

(56) References Cited

U.S. PATENT DOCUMENTS

| | | | |
|---|---|---|---|
| 7,858,004 B2 | 12/2010 | Harding et al. | |
| 7,964,267 B1 | 6/2011 | Lyons et al. | |
| 2013/0180588 A1* | 7/2013 | Hufen | H10K 77/111 |
| | | | 264/319 |
| 2017/0314894 A1 | 11/2017 | Tunis, III et al. | |
| 2017/0348947 A1 | 12/2017 | Cordova et al. | |
| 2017/0369654 A1 | 12/2017 | Kao et al. | |
| 2017/0373360 A1 | 12/2017 | Burkhardt et al. | |
| 2018/0261804 A1* | 9/2018 | Bayles | H01M 50/227 |
| 2019/0160782 A1* | 5/2019 | Harding | B32B 27/06 |
| 2019/0185602 A1 | 6/2019 | Bu et al. | |
| 2019/0185710 A1 | 6/2019 | Mulzer et al. | |
| 2022/0042639 A1* | 2/2022 | Grande | H05B 1/0244 |
| 2022/0090881 A1 | 3/2022 | Calis et al. | |
| 2022/0329677 A1 | 10/2022 | Wu et al. | |

OTHER PUBLICATIONS

English Translation of Notice of Preliminary Rejection dated Sep. 29, 2025 for relevant Korean Patent application No. 10-2023-7016860.
Decision On Rejection dated Aug. 25, 2025 of relevant Chinese Patent application No. 202080107692.3.
Substantive Examination Adverse Report dated Dec. 23, 2025 for relevant Malaysia Patent application No. PI2023002047.

* cited by examiner

*Primary Examiner* — Ramsey Zacharia

(57) ABSTRACT

The present disclosure is directed to a multifunctional laminate, a portable electronic device comprising an ultrahigh molecular weight polyethylene (UHMWPE) sheet, and methods for making and using the multifunctional laminate in a portable electronic device.

15 Claims, No Drawings

MULTIFUNCTIONAL SHEETS AND LAMINATES, ARTICLES, AND METHODS

FIELD

The present disclosure is directed to a multifunctional laminate, a portable electronic device comprising an ultra-high molecular weight polyethylene (UHMWPE) sheet, and methods for making and using the multifunctional laminate in a portable electronic device.

BACKGROUND

Mobile electronic devices, also known as personal or portable electronic devices (such as cellular phones, smart-phones, tablets, laptop computers, e-book readers, MP3 players, pocket PCs, and similar products) have components that generate heat. With the development of mobile electronic device technology and mobile internet, the functions and performance of mobile terminals have gradually approached or converged to computers, especially with the rapid development of the smartphone industry, the frequency of the main chips CPU and GPU within the terminal is higher and higher, and the number of cores of the CPU and GPU gradually evolves from a single core to dual cores, four cores and even eight cores, and the amount of data exchange between the terminal mobile phone and the network is also sharply increased, which greatly increases the power consumption of each chip in the terminal device. For example, when the temperature of a cell phone is high (especially when playing video games), the performance of the cell phone would be lowered due to the protection mechanism of the cell phone. The increase of the power consumption brings the heating problem of the terminal device, and it is hard to add a fan for cooling in the mobile terminal onto the CPU and GPU like on the computer. In addition, wireless charging is becoming a standard solution especially for future consumer electronics, so a heat dissipation solution that does not interfere with the wireless charging becomes critical.

At present, the heat dissipation ways for a mobile terminal is mainly to add a large-area copper foil laminating zone or graphite flake zone inside the case surface of the mobile terminal (such as inside the rear battery cover and inside the battery compartment case) to increase heat dissipation. With the characteristics of high lateral thermal conductivity of the copper foil and the graphite flake, the heat dissipation surface area of the case is increased for cooling. The key problem of the heat conduction way is to transfer the heat within heat source chips to the outside surface of the case quickly in low thermal resistance, thus it is beneficial to transfer the heat to the low-temperature zone of the outside surface from the high-temperature zone within the device. However, metal and graphite/graphene or semiconductors would interfere with/make it impossible for wireless charging and/or a wireless signal transmitting/receiving. Fans would increase the total volume and weight of the devices while needing extra power sources.

In addition, mobile devices are particularly susceptible to receiving damage from being dropped, at least because they are many times per day picked up, set down, used, or mishandled. Protective cases and covers have long been used for protecting such mobile devices. A need therefore exists for a multifunctional material systems capable of effectively dissipating heat while for wireless charging and protecting mobile devices without interfering with wireless signal transmitting/receiving to enable flexible antenna designs for mobile devices.

DETAILED DESCRIPTION

As used throughout this specification, the following abbreviations shall have the following meanings, unless the context clearly indicates otherwise: ° C.=degree Celsius; K=degree Kelvin; W=Watts; g=gram; nm=nanometer; $\mu$m=micron=micrometer; mm=millimeter; s=second; and min=minute. All amounts are percent by weight (wt %) and all ratios are molar ratios, unless otherwise noted. All numerical ranges are inclusive and combinable in any order, except where it is clear that such numerical ranges are constrained to added up to 100%. Unless otherwise noted, all polymer and oligomer molecular weights are weight average molecular weights ($M_w$) with unit of g/mol or Dalton and are determined using gel permeation chromatography compared to polystyrene standards.

The articles "a", "an" and "the" refer to the singular and the plural, unless the context clearly indicates otherwise. As used herein, the term "and/or" includes any and all combinations of one or more of the associated items. The term "polymer" refers to molecules composed of repeating monomer units. The term "copolymer" refers to a polymer composed of two or more chemically dissimilar monomers as polymerized units, and includes block copolymers, terpolymers, tetra polymers, and the like. Polymers and copolymers in the present disclosure may contain organic and/or inorganic additives.

It will be understood that although the terms first, second, third, etc. may be used herein to describe various elements, components, regions, layers and/or sections, these elements, components, regions, layers, and/or sections should not be limited by these terms. These terms are only used to distinguish one element, component, region, layer and/or section from another element, component, region, layer and/or section. Thus, a first element, component, region, layer and/or section could be termed a second element, component, region, layer and/or section without departing from the teachings of the present disclosure. When an element is referred to as being "on" or "disposed on" another element, it means positioning on or below the object portion, but does not essentially mean positioning on the upper side of the object portion based on a gravity direction, and it can be directly on the other element or intervening elements may be present therebetween. In contrast, when an element is referred to as being "directly on" or "disposed directly on" another element, there are no intervening elements present.

Furthermore, it will also be understood that when one element, component, region, layer and/or section is referred to as being "between" two elements, components, regions, layers and/or sections, it can be the only element, component, region, layer and/or section between the two elements, components, regions, layers and/or sections, or one or more intervening elements, components, regions, layers and/or sections may also be present.

The terms "film" includes "layer" and "sheet" like structure. The terms "film", "layer" and "sheet" are used interchangeably through this specification. A layer can be one layer or plurality of layers having the different physical properties or the same physical properties but different polymeric compositions.

A heat spreader of a device is commonly used to spread the heat from a heat source to a large area to facilitate heat dissipation or heat spreading. In the present disclosure, the term "heat dissipate", "heat dissipation", "heat dissipating", "heat spread", or "heat spreading" is used interchangeably.

The present disclosure is directed to a multifunctional laminate comprising an ultrahigh molecular weight polyethylene (UHMWPE) sheet, a first polymer layer and a second polymer layer, wherein the UHMWPE sheet is sandwiched between the first and second polymer layers and the first and second polymer layers are made of different materials.

It's known that a UHMWPE thin film through extensionally mechanical stretching can have high thermal conductivity. The UHMWPE sheet of the present disclosure comprises at least one UHMWPE layer. The UHMWPE layers are planar, i.e., have dimensions in two directions that are considerably greater than that of the third dimension. No solvent is used during the drawing process for making the UHMWPE layer. The draw ratio can be varied from 100 to 150. During the drawing process, the chains of polymer within a layer are oriented, i.e., substantially aligned, in the direction of the draw. The layer is cavitated during drawing. The density of a layer can be less than 0.90 g/cm$^3$, or less than 0.85 g/cm$^3$. The densities are determined using the layer areal density and the thickness of the layer as well as by helium pycnometry. Preparation of such UHMWPE layers are disclosed in U.S. Pat. No. 7,858,004 and U.S. Pat. Pub. No. 2017/0373360 A1, the entire contents of which are incorporated herein by reference.

A UHMWPE layer of the present disclosure has good thermal conductivity $k_∥$ in the direction of the draw. $k_∥$ can be at least 6 W/mK, or at least 10 W/mK, or at least 15 W/mK, or at least 20 W/mK, or at least 25 W/mK, or at least 30 W/mK, or at least 35 W/mK, or at least 40 W/mK, or at least 45 W/mK, or at least 50 W/mK, or at least 60 W/mK. The thermal conductivity perpendicular to the plane of the layer $k_⊥$ is greatly reduced. $k_⊥$ is equal to or less than 0.20 W/mK, or less than 0.18 W/mK, of less than 0.15 W/mK, The ratio of $k_∥/k_⊥$ is greater than 200, or greater than 250, or greater than 400.

A UHMWPE layer has other exceptional mechanical, chemical and electrical properties. For example, it is an extremely tough plastic with high elastic modulus, abrasion and wear resistance. It exhibits virtually no water adsorption. Also it is durable with low friction and strong chemical resistance. In addition, UHMWPE is an electric insulator and has good dielectric properties. The UHMWPE has a low dielectric constant Dk and low dissipation factor Df. For example, a UHMWPE layer has a Dk of less than 2.2 and Df of less than 0,00022 at a high frequency up to 30 GHz.

In some embodiments, the UHMWPE sheet can comprise two or more UHMWPE layers. This provides increased heat dissipation as well as increased mechanical strength. The two or more layers may be arranged in a layer structure with the drawn direction of each layer aligned with the drawn direction of every other layer in the sheet. Alternatively, the layers may be divided into two sets with the layers arranged alternately in a layer structure with the drawn direction of a first set at an angle with respect to the drawn direction of a second set to provide thermal conduction in two directions. In one embodiment the angle is 90 degrees. In some embodiments, the layers in a layer structure may be bonded together, e.g., by using an adhesive. In one embodiment, an adhesive with a thermal conductivity of at least 0.2 W/mK or at least 0.5 W/mK can be used for bonding the UHMWPE layers together.

The commercial product of a UHMWPE sheet can include, but are not limited to, DuPont™ Temprion™ OHS, commercially available from DuPont de Nemours, Inc.

Wilmington, Delaware and Endumax®, commercially available from Teijin Aramid, Arnhem, The Netherlands.

The first and second polymer layers can be a hard coat layer, an adhesive layer, or a protective layer. A hard coat layer can be made from an organic material, or an organic/inorganic hybrid material. Examples of the organic material can include, but are not limited to, epoxy-siloxane resin, silicone, poly(meth)acrylate, polyurethane-(meth)acrylate, polyurethane, epoxy, and combinations thereof. The inorganic materials can include, but are not limited to, silica, alumina, or zirconia. The organic/inorganic hybrid material can be polysilsesqiuoxane.

In one embodiment, a hard coat layer can be produced from a hard coating composition containing an epoxysiloxane oligomer, organic particles having an average diameter of 50 to 250 nm and a reactive carrier having one or more epoxy or oxetane moieties. The compositions and the resulting hard coat layers are disclosed in U.S. Patent Application No. 2019/0185710, the entire contents of which are incorporated herein by reference.

In another embodiment, a hard coat layer can be produced from a hard coating composition comprising siloxane oligomer or siloxane oligomer with nano particles of silica or a metal oxide. The compositions and hard coat layers are disclosed in U.S. Patent Application Nos. 2017/0369654 and 2019/0185633, the entire contents of which are incorporated herein by reference.

In yet another embodiment, a hard coat layer can comprise polyurethane-(meth)acrylate made from an ultraviolet curable acrylic composition as a hard coating composition. The composition can comprise aliphatic tri-, tetra-, or pentafunctional (meth)acrylate monomer, an acrylate monomer containing isocyanurate group, a urethane (meth)acrylate oligomer and a UV radical initiator. The compositions and hard coat layers are disclosed in U.S. Patent Application No. 2019/0185602, the entire contents of which are incorporated herein by reference.

The hard coating composition of the present disclosure can further comprise a toughing agent, an adhesion promoter, and an organic solvent. The toughening agents can be selected from the group consisting of epoxy compounds, polyether compounds and polyetheramines. A wide variety of adhesion promoters may be used and well-known in the art. Examples of the adhesion promoters can include, but are not limited to, a silane coupling agent such as 3-acryloxypropyl trimethoxy silane, methyltrimethoxy silane, aminopropyl trimethoxy silane, 8-methacryloxy-octyltrimethyoxy silane, ((chloromethyl)phenylethyl) trichloro silane, 1,2-bis (triethoxysilyl)ethane and N,N'-bis[3-(trimethyoxysilyl)propyl] ethylenediamine; and polyetheramines such as JEFFAMINE™ D230 and JEFFAMINE™ T403, commercially available from Huntsman Corporation, The Woodlands, Texas.

The organic solvents can be one or mixtures of two or more organic solvents. Examples of the organic solvent can include, but are not limited to, propylene glycol methyl ether; ether acetate such as propylene glycol methyl acetate; ketone such as methyl isobutyl ketone, methyl ethyl ketone, methyl propyl ketone, methyl isoamyl ketone and dimethyl ketone; esters such as methyl 2-hydroxyl isobutyrate, ethyl acetate and butyl acetate; and alcohols such as methanol and butanol; and mixtures thereof.

In some embodiments, a hard coat layer can comprise at least two hard coat layers. The hard coat layer can have a thickness of from 0.1 to 200 μm, or from 0.5 to 150 μm, or from 1 to 100 μm, or from 1 to 50 μm, or from 1 to 30 μm, or from 1 to 20 μm, or from 1 to 10 μm, or from 1 to 6 μm, or from 2 to 50 μm, or from 2 to 10 μm, or from 2 to 5 μm, or from 3 to 50 μm, or from 3 to 30 μm, or from 3 to 15 μm, or from 5 to 50 μm, μm or from 5 to 25 μm, or from 10 to 50 μm, or from 10 to 35 μm, or from 15 to 50 μm, or from 15 to 30 μm.

The hard coat layer can have a high modulus and hardness. The hard coat layer can have a pencil hardness at least 2H, or at least 3H, or at least 4H, or at least 5H, or at least 6H, or at least 7H, or at least 8H, or at least 9H. The pencil hardness is measured with a hard coat layer disposed on glass. The hard coat layer has a nanoindentation modulus of at least 3 GPa, or at least 4 GPa, or at least 8 GPa.

The adhesive layer may include a pressure sensitive adhesive (PSA), an optically clear adhesive (OCA), an optical clear resin (OCR), or the like. The adhesive layer may be formed in a film-like shape that may be adhered using a thermal or compressing process using silicone, silicone-(meth)acrylate, silicone-epoxy, polyurethane-(meth)acrylate, poly(meth)acrylate, poly(alkyl)acrylate, polybutadiene, ethylene vinyl acetate (EVA), polydimethyl-siloxane (PDMS), polyurethane (PU), vinyl ether polymers, epoxy, a block copolymer of styrene and butadiene, poly-styrene, polysaccharide, phenolic resin, protein-derived adhesive, polymers containing acrylic acid or methacrylic acid, polymers containing poly(hydroxyethyl)acrylate, and combinations thereof. The adhesive layer may be formed of a single material or two or more kinds of materials. In one embodiment, the adhesive layer may comprise a polymer having a glass transition temperature (T g) less than ~30° C. or higher than 80° C. In some embodiments, the adhesive layer can be replaced by an elastomer layer between the layers in the cover window assembly of the present invention. Thickness of the adhesive layer can be varied from 1 to 200 μm, or from 1 to 100 μm, or from 1 to 50 μm, or from 1 to 20 μm, or from 3 to 50 μm, or from 3 to 20 μm, or from 5 to 50 μm, or from 5 to 40 μm, or from 5 to 30 μm, or from 5 to 20 μm, or from 5 to 15 μm, or from 7 to 15 μm, or from 10 to 30 μm, or from 10 to 20 μm.

The protective layer can be any polymer layer that provides protection. Examples of the polymeric material used as the protective layer can include, but are not limited to, polyimide, polyimide-polyamide, polyamide, polyether-sulfone, cyclic olefin copolymer, polyester-imide, polycar-bonate, polyester, polyurethane, poly(meth)acrylate, poly-urethane-(meth)acrylate, silicone, styrene butadiene rubber (SBR), ethylene vinyl acetate (EVA) polymers, polyether block amide (PEBA), polyacrylic acid, fluorosilicone, poly-vinyl alcohol, polyetherimide, polystyrene, polyvinyl acetate, polycarbonate-urethane(meth)acrylate (PCUA), polyethylene terephthalate (PET), polyetherketone, polycar-bonate, polymethyl methacrylate, or combinations thereof. In some embodiments, the protective layer can be a ther-moplastic elastomer including but not limited to, polyure-thane, silicone, or their derivatives. In one embodiment, the protective layer can be a thermoplastic silicone vulcanizate (TPSiV), including TPSiV® thermoplastic elastomers, com-mercially available from DuPont de Nemours, Inc., Wilm-ington, Delaware. One example is TPSiV® 5300 A6002.

Thickness of the protective layer can be in a range of from 1 to 600 μm, or from 3 to 600 μm, or from 5 to 600 μm, or from 10 to 600 μm, or from 15 to 600 inn or 20 to 600 μm, 25 to 600 μm, or from 25 to 550 μm, or from 25 to 500 μm, or from 25 to 450 μm, or from 25 to 400 μm.

In some embodiments, the multifunctional laminate can further comprise a layer selected from the group consisting of a glass layer, a third polymer layer, a glass fiber layer, a ceramic layer, and combinations thereof. The third polymer layer can be the same as the first or second polymer layer described previously. In one embodiment, the third polymer layer can be a thermoplastic silicone vulcanizate (TPSiV).

The present disclosure is also directed to a multifunctional laminate comprising an ultrahigh molecular weight polyeth-ylene (UHMWPE) sheet, a first polymer layer and a layer, wherein the UHMWPE sheet is sandwiched between the first polymer layer and the layer, and wherein the layer is selected from the group consisting of a glass layer, a glass fiber layer, a ceramic layer, and combinations thereof. The UHMWPE sheet and the first polymer layer are the same as those described previously.

Any glass layer suitable for a portable electronic device can be used in the present disclosure. The glass layer may have a thickness of 0.1 microns, or 0.5 microns, or 1 micron, or microns, or 20 microns, or 30 microns, or 40 microns, or 50 microns, or 60 microns, or 70 microns, or 80 microns, or 90 microns, or 100 microns, or 125 microns, or 150 microns, or 175 microns, or 200 microns, or 250 microns, or 300 microns, or 350 micros, or 400 microns, or 500 microns, or 600 microns, or 700 microns, or 800 microns, or 900 microns. In some embodiments, the glass layer may be an ultra-thin glass layer. As used herein, the term "ultra-thin glass layer" means a glass layer having a thickness in the range of 0.1 microns to 75 microns.

A glass layer may be a non-strengthened, or chemically and/or thermally strengthened glass layer. Thermally strengthened glass layers are strengthened by heating a glass layer to an elevated temperature above the glass transition temperature of the glass, and cooling the surfaces of the layer rapidly ("quenching"), while the inner regions of the layer, insulated by the thickness and fairly low thermal conductivity of the glass, are cooled at a slower rate. For chemical strengthening processes of a glass layer, surface compressive stresses are generated by changing the chemi-cal composition of the glass in regions near the surface by a process such as ion diffusion. In some ion diffusion based processes, exterior portions of the resulting glass layers may be strengthened by exchanging larger ions for smaller ions near the surface to impart a negative tensile stress on or near the surface.

In some embodiments, a glass layer may have been subject to an ion exchange process. In such embodiments, the glass layer may be referred to as an ion-exchanged glass layer. The ion exchange process results in a glass layer having a compressive stress on at least one of top surface and/or bottom surface of glass layer, and a concentration of a metal oxide that is different at least two points through the thickness of glass layer. The metal oxide may be an alkali metal oxide.

A multifunctional laminate may be made by coating and laminating different layers. In some embodiments, a hard coating composition is coated on a UHMWPE sheet using any known coating techniques including but not limited to, slot die coating, drawdown bar coating, wire bar coating, roll-to-roll coating, slit coating, flexographic printing, imprinting, spray coating, dip coating, spin coating, flood coating, flow coating, screen printing, inkjet printing, gra-vure coating, and the like. The hard coating composition is the same as those described previously. After applying a layer of the hard coating composition on the UHMWPE sheet, the layer may optionally be soft baked, such as at a temperature of from 60 to 150° C., or 70 to 120° C., or 70 to 90° C., to remove any organic solvent.

The layer of the hard coating composition on the UHMWPE sheet is then cured by exposure to ultraviolet (UV) radiation, typically at a wavelength of from 240 to 400 nm, and for a sufficient UV dosage to form a cured hard coat layer on the UHMWPE sheet. A variety of UV systems can be used. Examples of the UV systems can include, but are not limited to, Fusion D bulb, H UV lamp, and a medium pressure mercury UV lamp. The particular wavelength used will depend on the particular photoinitiator or photoinitiators used in the hard coating composition. Such wavelength selection and UV dosages are well within the ability of those skilled in the art. In one embodiment, the UV dosages can be varied from 200 to 8,000 mJ/cm$^2$, or from 400 to 6,000 mJ/cm$^2$, or from 500 to 5,000 mJ/cm$^2$.

An adhesive layer can then be laminated on the UHMWPE side of the coated UHMWPE sheet through a laminator know to the art to form a multifunctional laminate. In some embodiments, a glass layer, glass fiber layer, ceramic layer or third polymer layer can further be laminated on the adhesive layer side of the multifunctional laminate. In one embodiment, the third polymer layer can be a thermoplastic silicone vulcanizate (TPSiV). The lamination can be conducted under 0.4 MPa and 100° C. at 1 ml/min to form a multifunctional laminate of the present disclosure.

In some embodiments, an adhesive layer can be laminated to a glass layer, glass fiber layer, ceramic layer or a third polymer layer to form a first laminate. An UHMWPE sheet can then be laminated on the side of the adhesive layer of the first laminate to form a second laminate. Furthermore, a hard coat layer can be formed by coating a hard coating composition on the top of the UHMWPE sheet to form a multifunctional laminate. The coating and laminating processes are the same as those described above.

In some embodiments, a hard coating composition is coated on a UHMWPE sheet using any known coating techniques as described above. The hard coating composition is the same as those described previously. After applying a layer of the hard coating composition on the UHMWPE sheet, the layer may optionally be soft baked to remove any organic solvent. The layer of the hard coating composition on the UHMWPE sheet is then cured by exposure to ultraviolet (UV) radiation. The uncoated side of the coated UHMWPE sheet is then laminated to a polymer layer. The lamination can be conducted under 0.4 MPa and 100° C.-120° C. at 1 ml/min. The polymer layer is the same as those described as the first, second or third polymer layer. In one embodiment, the polymer layer can be a thermoplastic silicone vulcanizate (TPSiV).

The multifunctional laminate of the present disclosure has improved thermal and mechanical properties. Thermal properties of the multifunctional laminate can include, for example, thermal conductivity, thermal conductance, specific heat capacity, heat capacity, thermal diffusivity, or the like. Thermal conductivity is proportional to the intrinsic temperature difference across a distance in response to an applied heat flux through a material, with typical units of power per length-temperature, such as Watts per meter-Kelvin. Thermal conductance is the time rate of steady-state heat flow through a unit area of a material induced by a unit temperature difference between the body surfaces, with typical units of power per temperature, such as Watts per Kelvin. Specific heat capacity is intrinsic temperature rise in response to heat energy, with typical units of energy per mass-temperature, such as Joules per kilogram-Kelvin. Heat capacity includes mass of material, with typical units of energy per temperature, such as Joules per Kelvin. Thermal diffusivity is the ratio of thermal conductivity to the product of mass density and specific heat capacity and indicates how quickly a material would reach a temperature similar to its surrounding environment, with typical units of area per time, such as square meters per second.

The thermal properties of the laminates may be measured using the methods known to a person of ordinary skill in the art. For example, Angstrom or thermal wave technique is often used for measuring thermal diffusivity of solid materials. The thermal diffusivity of a material is normally directly measured by utilizing transient methods that uses the measured transient temperature response to a time varying heat source. The transient methods are classified into transitory and periodic temperature methods. In transitory methods the thermal diffusivity is estimated from the sample temperature response to a sudden change in input heat. A well-known example is the flash method such as laser flash analysis or Xenon lamp flash analysis. In the periodic temperature method, thermal diffusivity is estimated from the sample response to a periodic (time varying) heat input. Examples can include 3ω-method and the Angstrom method. Other methods for measuring thermal properties can include, but are not limited to, transient grating spectroscopy, beam deflection techniques, thermal imaging techniques, standard test methods for measuring thermal transmission properties of thermal interface materials according to ASTM D5470-12, and thermal cycling.

Ball drop testing can reveal wide ranges of impact resistance of material from external force. In the present disclosure, a ball drop testing is used to evaluate the impact resistance of a UHMWPE sheet or a multifunctional laminate for protecting a 300 μm thick glass layer. The UHMWPE or the multifunctional laminate without glass layer, glass fiber layer or ceramic layer of the present disclosure is adhered to a 300 μm thick glass using a 10 μm adhesive for the ball drop testing. The multifunctional laminate containing a glass layer, glass fiber layer or ceramic layer can directly be used for the ball drop testing. A 32 grams ball having a diameter of about 20 mm can be used for the ball drop testing. A height from which the ball is dropped is recorded. The UHMWPE and multifunctional laminate can have a height of at least 60 cm, or at least 80 cm, or at least 100 cm without any visual cracks on the surface of the glass layer after the ball hits the surface of the glass layer.

Pen drop testing can also reveal wide ranges of impact resistance of external force. In the present disclosure, a pen drop testing is also used to evaluate the impact resistance of a UHMWPE sheet or a multifunctional laminate for protecting a 300 μm thick glass. The UHMWPE or the multifunctional laminate without glass layer, glass fiber layer or ceramic layer of the present disclosure is adhered to a 300 μm thick glass using a 10 μm adhesive for the ball drop testing. The multifunctional laminate containing a glass layer, glass fiber layer or ceramic layer can directly be used for the pen drop testing. A pen having a total weight of 11 grams with a tip having a diameter of 0.5 mm can be used for the pen drop testing. The UHMWPE and multifunctional laminate can have a height of at least 40 cm, or at least 50 cm, or at least 60 cm, or at least 80 cm, or at least 85 cm without any visual cracks on the surface of the glass layer after the pen hit the surface of the glass layer.

An electric device may have a housing. Electronic components and mechanical structures may be enclosed in the housing. Housing may cover a front surface, sidewalls and a rear surface of the device. Housing may be implemented using multiple structures that are assembled together. Housing may be formed from a central frame to which a front and real panels are attached. The front and rear panels can comprise many layers having different functions. In some cases, the front and/or rear panels may include an outside transparent layer (e.g. cover glass or transparent polymer films). The panels may be removable. For example, the rear panel can be detached from the rest of the housing in order to provide internal access to the electronic device.

The present disclosure is also directed to a rear panel of housing for a portable electronic device. The rear panel can be used to dissipate heat and protect the portable electronic device from impact of external force. The portable electronic device is selected from the group consisting of a smartphone, a personal digital assistant, a camera, an audio player, an audio recording device, a medical instrument, an electronic tool, a radio, and illumination device, a firearm, a game console, a key fob, and combinations thereof. In one embodiment, the portable electronic device is a smartphone.

The rear panel of housing can be a planar rear panel. In some embodiments, the planar rear panel comprises an UHMWPE sheet. In some embodiments, the planar rear panel comprises a multifunctional laminate. The UHMWPE sheet and the multifunctional laminate are the same as those described previously. The rear panel of the present disclosure can be flexible or rigid so it can be positioned in any place of a rear housing in the portable electronic device to achieve the fastest heat dissipation. The rear housing has an inner surface which faces towards the electronic components of a portable electronic device and an outer surface which faces away from the electronic components. In some embodiments, the rear panel can be placed on an inner surface of a rear housing of the portable electronic device. In one embodiment, the rear panel can be placed within a recess in the rear housing of the portable electronic device. In some embodiments, the rear panel can be placed on an outer surface of a rear housing of the portable electronic device. In one embodiment, the rear panel can be adhered to the rear housing of the portable electronic device with an adhesive. The adhesive can be the same polymer material as the adhesive layers described previously.

The present disclosure is also directed to a portable electronic device comprising a rear panel of housing. The rear panel of housing is the same as those described previously. The portable electronic device is selected from the group consisting of a smartphone, a personal digital assistant, a camera, an audio player, an audio recording device, a medical instrument, an electronic tool, a radio, and illumination device, a firearm, a game console, a key fob, and combinations thereof. In one embodiment, the portable electronic device is a smartphone. The smartphone having the rear panel of the present disclosure can quickly dissipate the heat generated from the hot spot in the back of the smartphone, for example, from GPU and CPU so a user can experience improved performance and better temperature feels when holding the smartphone. AnTuTu App can be used to indirectly measure thermal performance of GPU and CPU in a smartphone. The AnTuTu App is a benchmarking tool for smartphones and tablets, which let a user check the performance of the smartphones and tablets. In some embodiments, the smartphone comprising the rear panel of the present disclosure can have performance scoring to be increased at least 6% compared to the smartphone without rear panel using the AnTuTu App. In addition, the rear panel of the present disclosure is electrically insulative so the smartphone can be used for wireless charging without interference with the signal transmission from the back of the smartphone. Furthermore, the smartphone of the present disclosure can have better protection from impact of external force such as dropping.

Normally, a portable electronic device is exposed to harsh environmental conditions. For example, the portable electronic device can be damaged through rough handling and dropping. Further, industrial chemicals, grease, water, dirt, and grime may damage or destroy a functioning device and inhibit the use of the device's valuable data. It is common to hold a portable electronic device inside a protective case for transport and use. The present disclosure is also directed to a protective case for a portable electronic device. The portable device is the same as those described previously. In some embodiments, the protective case comprises an UHMWPE sheet. The UHMWPE sheet is the same as those described previously. In some embodiments, the protective case comprises a multifunctional laminate. The multifunctional laminate is the same as those described previously. The protective case is adapted to receive and at least partially enclose the portable electronic device. In one embodiment, the protective case can be used to enclose a back of a smartphone. The protective case used for enclosing the back of the smartphone can improve heat dissipation and damages from dropping the smartphone.

EXAMPLES

Materials

Hard Coat Liquid Formulation—P2

The formulation was prepared by mixing Ebercryl™ 8602 (45 parts per weight, Allnex), Photomer® 4356 (20 parts per weight, IGM Resins), Sartomer SR399 (15 parts per weight, Arkema), Ebercryl™ LED 02 (15 parts per weight, Allnex), Esacure KTO 46 (5 parts per weight, IGM Resins) in propylene glycol methyl ether acetate (166.67 parts per weight, Sigma-Aldrich). The resulting mixture was filtered (pore size 0.2 µm, Whatman™), and then OPTOOL DAC-HP (1 part per weight, Daikin Industries, Ltd.) and NANOBYK-3601 (1 part per weight, BYK USA Inc.) were added, followed by filtration (pore size 1.0 µm, Whatman™). The final formulation concentration range was adjusted to 20 to 60 wt % solids through further dilution with either propylene glycol methyl ether acetate (Sigma-Aldrich), methyl isobutyl ketone (Sigma-Aldrich), or 2-pentanone (Sigma-Aldrich).

UHMWPE Layer

A 60 µm DuPont™ Temprion™ OHS Film with an in-plane thermal conductivity of W/mK (machine direction), 0.2 W/mK (traverse direction), and a through-plane thermal conductivity of 0.2 W/mK; commercially available from DuPont de Nemours, Inc., Wilmington, Delaware.

UHMWPE Sheet

The UHMWPE layers were stacked relative to their higher thermal conductive direction with an alignment angle of 90°, thus having an in-plane thermal conductivity of about 16 W/mK in both of the machine and traverse directions. The UHMWPE sheet had a thickness of 120 µm.

Adhesive Layer

A 10 µm polyacrylate double-side adhesive film roll, commercially available from Sichuan EM Technology Co. Ltd.

Glass Layer

A 0.3 mm glass layer, Eagle XG (0.3 mm), commercially available from Corning Incorporated.

Preparation of Laminates

Example 1

The adhesive roll was positioned on a holder rack and was laminated on the 0.3 mm glass layer with a C-Sun M25E laminator (commercially available from C Sun, Taiwan, R.O.C.), under 0.4 MPa, at 1 m/min speed and 100° C. to form a first laminate. The UHMWPE sheet was then laminated on the adhesive side of the first laminate under 0.4 MPa, at 1 m/min and 100° C. to form a multifunctional laminate.

Example 2

The adhesive roll was positioned on a holder rack and was laminated on the 0.3 mm glass with a C-Sun M25E laminator (commercially available from C Sun, Taiwan, R.O.C.), under 0.4 MPa, at 1 m/min speed and 100° C. to form a first laminate. The UHMWPE sheet was then laminated on the adhesive side of the first laminate under 0.4 MPa, at 1 m/min and 100° C. to form a second laminate. A mixture of 10.2 g of P2 and 10.2 g of propylene glycol monomethyl ether acetate (PGMEA) was coated on the top of the UHMWPE sheet of the second laminate with a bar coater, dried at 90° C. in an oven for 5 mins, and cured with Heraeus Fusion H UV lamp for 5 seconds to form a multifunctional laminate. The hard coated layer was 2-3 μm thick after curing.

Comparative Example 1

A laminate was made using the same procedure as Example 1 except the UHMWPE sheet was replaced with a PET film having a thickness of 120 μm.

Comparative Example 2

A laminate was made using the same procedure as Example 2 except the UHMWPE sheet was replaced with a PET film having a thickness of 120 μm.

Ball Drop Testing

Ball drop testing was conducted to evaluate the impact resistance of a laminate from damage. The laminate obtained from Example 1 or Comparative Example 1 was placed on a top of a 180 μm thick stainless steel spacer with the UHMWPE sheet or PET film of the laminate directly contacted the stainless steel spacer. The stain steel spacer was attached to a stainless steel table. A 32 grams of stainless steel ball with a diameter of about 20 mm was dropped from different heights measured from the top of the laminate to evaluate the effectiveness of laminate for protecting the glass layer of the laminate. The laminate of Example 1 showed visually crack on the surface of the glass layer when the ball dropped at a height of 100 cm while the laminate of Comparative Example 1 showed visually crack on the surface of the glass layer when the ball dropped at a height of 26 cm.

Pen Drop Testing

Pen drop testing was conducted to evaluate the impact resistance of a laminate from damage. The laminate obtained from Example 2 or Comparative Example 2 was placed on a top of a 180 μm thick stain steel spacer with the hard coat layer of the laminate directly contacted the stainless steel spacer. The stain steel spacer was attached to a stainless steel table. A 11 grams of pen with a tip having a diameter of about 0.5 mm was dropped from different heights measured from the top of the laminate to evaluate the effectiveness of the laminate for protecting the glass layer of the laminate. The laminate of Example 2 showed visually crack on the surface of the glass layer when the pen dropped at a height of 88 cm while the laminate of Comparative Example 2 showed visually crack on the surface of the glass layer when the pen dropped at a height of 28 cm.

What is claimed is:

1. A multifunctional laminate comprising an ultrahigh molecular weight polyethylene (UHMWPE) sheet, a first polymer layer and a second polymer layer, wherein:
the UHMWPE sheet is sandwiched between the first and second polymer layers;
the first polymer layer is a protective layer or a hard coat layer;
the second polymer layer is a protective layer, a hard coat layer, or an adhesive layer;
the first and second polymer layers are made of different materials;
the protective layer comprises a polymer material selected from the group consisting of polyimide-polyamide, polyamide, polyethersulfone, cyclic olefin copolymer, polyester-imide, polycarbonate, polyester, polyurethane, poly(meth)acrylate, polyurethane-(meth)acrylate, silicone, styrene butadiene rubber (SBR), ethylene vinyl acetate (EVA) polymers, polyether block amide (PEBA), polyacrylic acid, fluorosilicone, polyvinyl alcohol, polyetherimide, polystyrene, polyvinyl acetate, polycarbonate-urethane (meth)acrylate (PCUA), polyethylene terephthalate (PET), polyetherketone, polycarbonate, polymethyl methacrylate, combinations thereof, or a thermoplastic elastomer; and
when adhered to a 300 μm thick glass using a 10 μm adhesive for ball drop testing using a 32 gram ball having a diameter of 20 mm, the multifunctional laminate has a ball drop height of at least 60 cm without any visual cracks on the surface of the glass layer after the ball hits the surface of the glass layer, wherein the multifunctional laminate is configured as a rear panel of housing for a portable electronic device or a protective case of a portable electronic device.

2. The multifunctional laminate of claim 1, wherein the UHMWPE sheet comprises at least one UHMWPE layer and has a density of less than 0.90 g/cm³.

3. The multifunctional laminate of claim 2, wherein the at least one UHMWPE layer is drawn in the absence of a solvent and has a thermal conductivity in the drawn direction, k∥ of at least 6 W/mK and a thermal conductivity perpendicular to the plane of the layer, k⊥ of equal to or less than 0.20 W/mK.

4. The multifunctional laminate of claim 2, wherein the UHMWPE sheet comprises two or more UHMWPE layers and the two or more UHMWPE layers are divided into two sets with the layers arranged alternately in a layer structure with the drawn direction of a first set perpendicular to the drawn direction of a second set to provide thermal conduction in two directions.

5. The multifunctional laminate of claim 1, wherein the laminate further comprises a layer selected from the group consisting of a glass layer, a third polymer layer, a glass fiber layer, a ceramic layer, and combinations thereof.

6. The multifunctional laminate of claim 5, wherein the third polymer is the same as or different from the first or second polymer layer.

7. A rear panel of housing for a portable electronic device comprising the multifunctional laminate of claim 1.

8. The rear panel of claim 7, wherein the rear panel is placed on an inner surface of a rear housing of the portable electronic device.

9. The rear panel of claim 8, wherein the rear panel is placed within a recess in the rear housing of the portable electronic device.

10. The rear panel of claim 7, wherein the rear panel is placed on an outer surface of a rear housing of the portable electronic device.

11. The rear panel of claim 10, wherein the rear panel is adhered to the rear housing of the portable electronic device with an adhesive.

12. A protective case of a portable electronic device comprising the multifunctional laminate of claim 1.

13. The multifunctional laminate of claim 1, wherein the thermoplastic elastomer comprises polyurethane, silicone, or their derivatives.

14. The multifunctional laminate of claim 1, wherein the hard coat layer comprises epoxy-siloxane resin, silicone, poly(meth)acrylate, polyurethane-(meth)acrylate, polyurethane, epoxy, combinations thereof, or polysilsesqiuoxane.

15. The multifunctional laminate of claim 14, wherein the hard coat layer further comprises silica, alumina, or zirconia.

\* \* \* \* \*